US007945255B2

(12) United States Patent
Harris et al.

(10) Patent No.: US 7,945,255 B2
(45) Date of Patent: May 17, 2011

(54) METHOD AND APPARATUS FOR PROVIDING DEFERABLE DATA SERVICES IN A CELLULAR COMMUNICATION SYSTEM

(75) Inventors: John M. Harris, Chicago, IL (US); Jay Jayapalan, Buffalo Grove, IL (US); John C. Kay, Elgin, IL (US); Sean S. Kelley, Hoffman Estates, IL (US)

(73) Assignee: Motorola Mobility, Inc., Libertyville, IL (US)

( * ) Notice: Subject to any disclaimer, the term of this patent is extended or adjusted under 35 U.S.C. 154(b) by 221 days.

(21) Appl. No.: 12/189,928

(22) Filed: Aug. 12, 2008

(65) Prior Publication Data

US 2008/0293429 A1 Nov. 27, 2008

Related U.S. Application Data

(62) Division of application No. 11/257,548, filed on Oct. 25, 2005, now Pat. No. 7,689,208, which is a division of application No. 10/389,404, filed on Mar. 14, 2003, now Pat. No. 6,999,759.

(51) Int. Cl.
*H04M 3/00* (2006.01)
(52) U.S. Cl. .............. 455/418; 455/414.1; 455/406; 370/328
(58) Field of Classification Search ........... 455/418, 455/406, 414.1; 370/328
See application file for complete search history.

(56) References Cited

U.S. PATENT DOCUMENTS

| | | | |
|---|---|---|---|
| 5,239,666 A * | 8/1993 | Truby | 455/9 |
| 5,884,250 A | 3/1999 | Ono et al. | |
| 5,903,831 A | 5/1999 | Foti | |

(Continued)

FOREIGN PATENT DOCUMENTS

EP 0 994 608 A 4/2000

(Continued)

OTHER PUBLICATIONS

IEEE Std. 802.3x-1997 and IEEE Std 802.3y-1997, IEEE Standards for Local Metropolitan Area Networks: Supplements to Carrier Sense Multiple Access with Collision Detection (CSMA/CD) Access Method and Physical Layer Specification—Specification for 802.3 Full Duplex Operation and Physical Layer Specification for 100 Mb/s Operation on Two Pairs of Category 3 or Better Balanced Twisted Pair Cable (100BASE-T2), approved Mar. 20, 1997 IEEE Standards Board, approved Sep. 5, 1997 American National Stands Institute, pp. 313-320.

(Continued)

*Primary Examiner* — Danh C Le (57) ABSTRACT

A communication system, upon receiving an instruction to transfer deferrable data, determines whether an air interface is congested and, when the air interface is congested, defers a transfer of the deferrable data or transfers the deferrable, lower priority data as higher priority data. When, during a transfer of deferrable data, the system determines that the air interface is congested, the system may terminate the call and save a state of a partially completed deferred data transfer. Subsequent to the termination of the call, the system establishes another data connection over the air interface and transfers any remaining, not yet transferred deferrable data. In order to discourage subscribers from transferring higher priority data as lower priority data, the system may further restrict a transfer of lower priority data to designated time periods while allowing a transfer of higher priority data during the designated time periods and other time periods.

9 Claims, 8 Drawing Sheets

U.S. PATENT DOCUMENTS

| | | | |
|---|---|---|---|
| 5,918,182 A | 6/1999 | Korus et al. | |
| 5,987,334 A * | 11/1999 | Kaku | 455/552.1 |
| 6,091,709 A * | 7/2000 | Harrison et al. | 370/235 |
| 6,148,330 A | 11/2000 | Puri et al. | |
| 6,256,310 B1 | 7/2001 | Kim et al. | |
| 6,564,061 B1 | 5/2003 | Guo et al. | |
| 6,728,211 B1 | 4/2004 | Peris et al. | |
| 6,842,424 B1 | 1/2005 | Key et al. | |
| 6,856,598 B1 | 2/2005 | Stanfield | |
| 6,873,617 B1 | 3/2005 | Karras | |
| 2001/0055950 A1 | 12/2001 | Davies et al. | |
| 2002/0024952 A1 | 2/2002 | Negishi et al. | |
| 2002/0141454 A1 | 10/2002 | Muniere | |
| 2002/0154610 A1 | 10/2002 | Tiedemann, Jr. et al. | |
| 2002/0181410 A1 | 12/2002 | Bae et al. | |
| 2002/0188744 A1 | 12/2002 | Mani | |
| 2002/0194065 A1 | 12/2002 | Barel et al. | |
| 2003/0003960 A1 | 1/2003 | Shoji et al. | |
| 2003/0099197 A1 | 5/2003 | Yokota et al. | |
| 2003/0134422 A1 | 7/2003 | Sayre | |
| 2003/0142623 A1 | 7/2003 | Bernhard et al. | |
| 2004/0008628 A1 | 1/2004 | Banerjee | |
| 2004/0085943 A1 | 5/2004 | Hsu et al. | |
| 2004/0117236 A1 | 6/2004 | Subramanian et al. | |
| 2004/0170127 A1 | 9/2004 | Tanaka | |

FOREIGN PATENT DOCUMENTS

| | | |
|---|---|---|
| EP | 0994608 A2 | 4/2000 |
| EP | 1 418 715 A | 5/2004 |
| JP | 7264204 | 10/1995 |
| JP | 7283763 | 10/1995 |
| JP | 8317471 | 11/1996 |
| JP | 233218 | 9/1997 |
| JP | 2001078260 | 3/2001 |
| JP | 2003-032296 A | 1/2003 |
| WO | 0072516 A1 | 11/2000 |
| WO | WO 2000/072516 A1 | 11/2000 |
| WO | 0110080 A2 | 2/2001 |
| WO | 0147287 A2 | 6/2001 |

OTHER PUBLICATIONS

Schilit, et al., "TeleWeb: Loosely Connected Access to the World Wide Web," Computer Networks and ISDN Systems, North Holland Publishing, Amsterdam, Netherlands, vol. 28, No. 11, May 1, 1996, pp. 1431-1444.

Christine Kesting, "Corresponding Divisional Application EP 10 00 3353.9—Extended European Search Report," European Patent Office, Rijswijk, Netherlands, Jun. 7, 2010, 7 pages, most relevant pp. 2-6.

* cited by examiner

METHOD AND APPARATUS FOR PROVIDING DEFERRABLE DATA SERVICES IN A CELLULAR COMMUNICATION SYSTEM

CROSS-REFERENCE TO RELATED APPLICATION

This application is a divisional of co-pending U.S. patent application Ser. No. 11/257,548, filed Oct. 25, 2005, which application is a divisional of parent U.S. patent application Ser. No. 10/389,404, and which parent application was filed Mar. 14, 2003, and issued as U.S. Pat. No. 6,999,759. This application hereby claims priority to both such U.S. patent applications, that is, to both U.S. patent application Ser. No. 11/257,548 and U.S. patent application Ser. No. 10/389,404.

FIELD OF THE INVENTION

The present invention relates generally to cellular communication systems, and, in particular, to a provision of deferrable data services in a cellular communication system.

BACKGROUND OF THE INVENTION

As cellular service providers upgrade their networks to the new generation systems, such as 2.5G (2.5 Generation) and 3G systems, the networks can provide data services that could not be provided by the older systems. For example, the 2.5G and 3G systems are able to transport photographs and provide email services, such as email with attachments, which could not be provided by the predecessor systems. However, such data services consume a great deal of bandwidth, which is a limited, and as a result an expensive, resource.

In order to provide reasonable customer service, cellular service providers must have sufficient bandwidth to meet peak load demands. With the additional data services made possible by 2.5G and 3G systems, cellular service providers may not have sufficient bandwidth available to meet peak load demands or may have to acquire additional bandwidth at great, and possibly prohibitive, expense. A result is diminished customer service or excessive corporate debt load. However, ample bandwidth is available if the data services may be shifted to off load periods. For example, in a typical wireless communication system, average utilization of radio frequency (RF) bandwidth is low, commonly in a range of 35 percent (%) to 65 percent (%). However, instantaneous RF bandwidth utilization during peak load time periods may be considerably higher and can approach 100 percent (%), while off load RF bandwidth utilization may be considerably lower, at times 10 percent (%) or less.

Therefore, a need exists for a method and apparatus that shifts a provision of data services by cellular service providers to off load periods.

DETAILED DESCRIPTION OF THE INVENTION

To address the need for a method and an apparatus that shifts a provision of data services by cellular service providers to off load periods, a communication system is provided wherein, when an instruction to transfer deferrable data is received, the system determines whether an air interface is congested and, when the air interface is congested, defers a transfer of the deferrable data or transfers the deferrable, lower priority data as higher priority data. When, during a transfer of deferrable data, the communication system determines that the air interface is congested, the communication system may terminate the call and save a state of a partially completed deferred data transfer. Subsequent to the termination of the call, the system establishes another data connection over the air interface and transfers any remaining, not yet transferred deferrable data over the established data connection. In order to discourage system subscribers from transferring higher priority data as lower priority data, the communication system may further restrict a transfer of lower priority data to designated time periods while allowing a transfer of higher priority data during the designated time periods and other time periods.

Generally, an embodiment of the present invention encompasses a method for transferring deferrable data in a wireless communication system. The method includes receiving an instruction to transfer deferrable data, determining whether an air interface is congested; and when the air interface is congested, deferring a transfer of the deferrable data.

Another embodiment of the present invention encompasses a method for transferring deferrable data in a wireless communication system. The method includes receiving an instruction to transfer deferrable data, wherein the deferrable data is data of a first priority, determining that an air interface is congested, and, in response to determining that the air interface is congested, transferring the deferrable data as data of a second priority.

Yet another embodiment of the present invention encompasses a method for transferring deferrable data in a wireless communication system. The method includes engaging in a call involving a mobile station and a transfer of deferrable data via a first data connection over an air interface, determining that the air interface is congested, and, in response to determining that the air interface is congested, terminating the call and saving a state of a partially completed deferred data transfer in the mobile station. The method further includes, subsequent to terminating the call, establishing a second data connection over the air interface and transferring any remaining, not yet transferred deferrable data over the second data connection.

Still another embodiment of the present invention encompasses a mobile station capable of transferring deferrable data in a wireless communication system. The mobile station includes at least one memory device capable of storing deferrable data. The mobile station further includes a processor associated with the at least one memory device that receives an instruction to transfer deferrable data, determines whether an air interface is congested, defers a transfer of the deferrable data when the air interface is congested, and transfers the deferrable data when the air interface is not congested.

Yet another embodiment of the present invention encompasses a mobile station capable of transferring deferrable data in a wireless communication system. The mobile station includes at least one memory device that stores deferrable data. The mobile station further includes a processor associated with the at least one memory device that receives an instruction to transfer deferrable data, wherein the deferrable data is data of a first priority, determines that an air interface is congested, and, in response to determining that the air interface is congested, transfers the deferrable data as data of a second priority.

Still another embodiment of the present invention encompasses a mobile station capable of transferring deferrable data in a wireless communication system. The mobile station includes at least one memory device capable of storing deferrable data. The mobile station further includes a processor associated with the at least one memory device, wherein the processor is capable of establishing a first data connection over an air interface, engaging in a call involving a transfer of the deferrable data via the first data connection, determining that the air interface is congested, in response to determining that the air interface is congested, terminating the call, storing a state of a partially completed transfer in the mobile station in the at least one memory device, subsequent to terminating the call, establishing a second data connection over the air interface, and transferring any remaining, not yet transferred deferrable data over the second data connection.

Yet another embodiment of the present invention encompasses an apparatus for transferring deferrable data in a wireless communication system. The apparatus comprises a controller in a radio access network having at least one memory device that stores instructions on assembling an overhead message having a deferrable data permission data field and a processor associated with the at least one memory device that assembles the overhead message, embeds data in the deferrable data permission data field that informs whether transfer of deferrable data is permitted, and conveys the overhead message to a mobile station.

Figure 1:
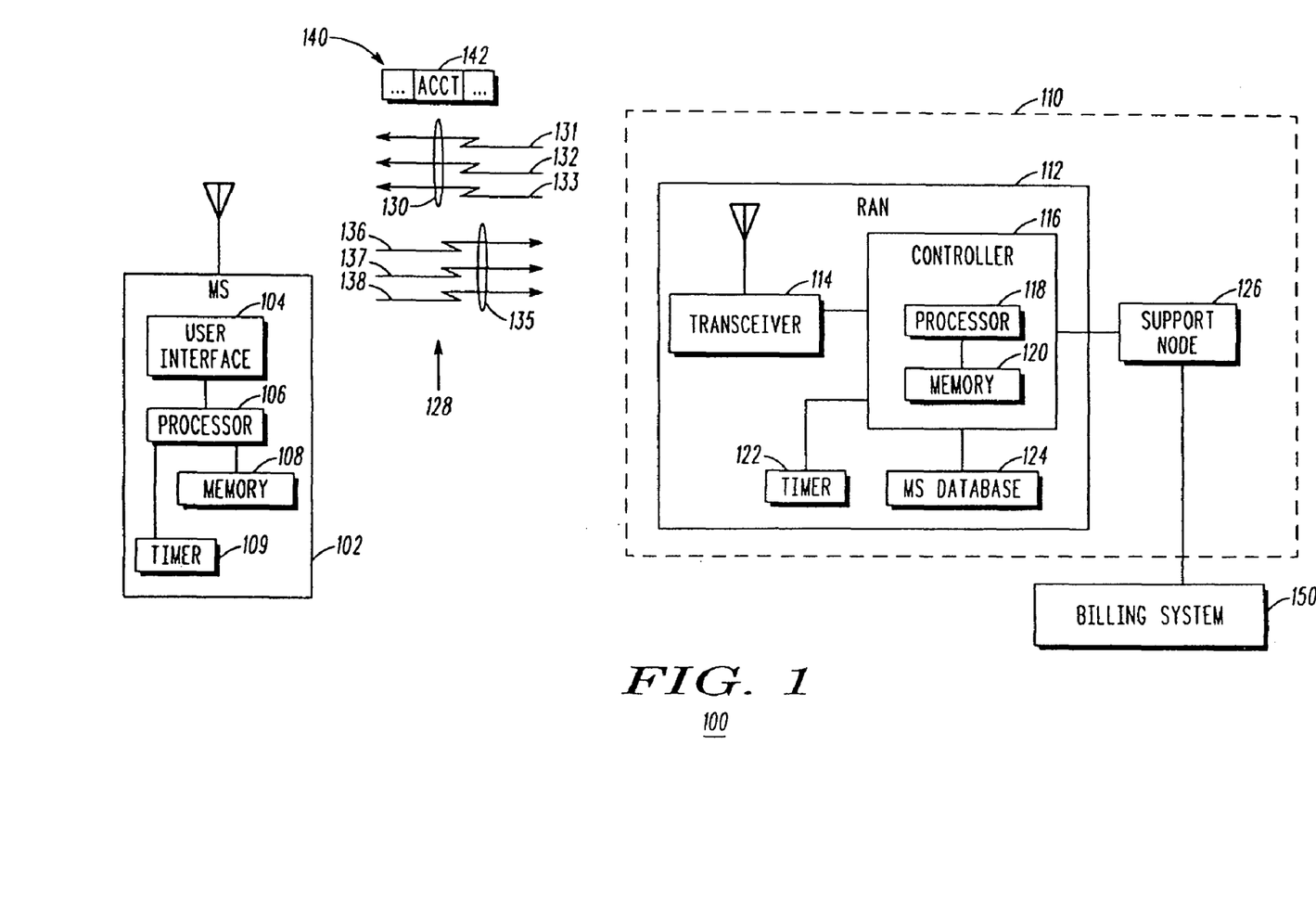
FIG. 1 is a block diagram of a wireless communication system in accordance with an embodiment of the present invention.

Yet another embodiment of the present invention encompasses a method for transferring data in a wireless communication system, wherein the data comprises a higher priority data and a lower priority data. The method includes restricting a transfer of the lower priority data to a plurality of designated time periods and allowing a transfer of the higher priority data during the plurality of designated time periods and other time periods The present invention may be more fully described with reference to FIGS. 1-7. FIG. 1 is a block diagram of a wireless communication system 100 in accordance with an embodiment of the present invention. Communication system 100 includes at least one mobile station (MS) 102 in wireless communication with a Radio Access Network (RAN) 112. RAN 112 includes at least one transceiver 114 that is operably coupled to a controller 116. Communication system 100 further includes a support node 126, such as a Serving GPRS Support Node (SGSN) or a Packet Data Support Node (PDSN), that is operably coupled to RAN 112 and that is further coupled to a billing system 150 that includes an Authentication, Authorization, and Accounting (AAA) server (not shown). RAN 112 and support node 126 are collectively referred to as a wireless infrastructure 110. As is known in the art, RAN 112 may include elements such as a Base Transceiver Station (BTS), a Base Station Controller (BSC), and a Packet Control Unit (PCU) or a Packet Control Function (PCF). When a RAN, such as RAN 112, includes such elements, controller 116 may be included in any one of such elements or may be distributed among such elements.

RAN 112 provides communications services to mobile stations, such as MS 102, located in a coverage area serviced by the RAN via an air interface 128. Air interface 128 comprises a forward link 130 and a reverse link 135 that each includes multiple communication channels. Preferably, forward link 130 includes a paging channel 131, at least one forward link signaling channel 132, and at least one forward link traffic channel 133. Preferably, reverse link 135 includes a reverse link access channel 136, at least one reverse link signaling channel 137, and at least one reverse link traffic channel 138.

Each of MS 102 and controller 116 includes a respective processor 106, 118, such as one or more microprocessors, microcontrollers, digital signal processors (DSPs), combinations thereof or such other devices known to those having ordinary skill in the art. Each of MS 102 and controller 116 further includes a respective one or more memory devices 108, 120 associated with the respective processor, such as random access memory (RAM), dynamic random access memory (DRAM), and/or read only memory (ROM) or equivalents thereof, that store data and programs that may be executed by the respective processor and allow the processor to operate in communication system 100.

Each of memory devices 108, 120, further stores multiple Service Option (SO) values, such as an SO value corresponding to 'normal' data, for example, SO 0x0021 (that is, '33' in a hexadecimal representation), and an SO value corresponding to 'deferrable' data, for example, SO 0x801B. In addition to, or instead of, storing SO values, each of memory devices 108, 120, may store multiple Quality of Service (QoS) parameters. A first set of QoS parameters of the multiple QoS parameters corresponds to desired quality of service for transfer of data of a first priority, that is, lower priority data such as 'deferrable' data. A second set of QoS parameters of the multiple QoS parameters corresponds to a desired quality of service for transfer of data of a second priority, that is, higher priority data such as 'normal' data.

MS 102 further includes a user interface 104 that is coupled to processor 106. User interface 104 provides a user of the MS with the capability of interacting with the MS, including inputting instructions into the MS. In one embodiment of the present invention, user interface 104 includes a display screen and a keypad. In another embodiment of the present invention, the display screen of user interface 104 includes a touch screen capable of determining a position (i.e., an X-coordinate and a Y-coordinate) of a user's touch and conveying the position data to processor 106. Based on the position data, processor 106 then translates the user's touch into an instruction. In still another embodiment of the present invention, user interface 104 may further include a camera or an interface capable of coupling to a camera that respectively records or receives photographic data. MS 102 then digitally stores the photographic data in memory devices 108.

Preferably, communication system 100 is a Code Division Multiple Access (CDMA) communication system that operates in accordance with the 3GPP2 (Third Generation Partnership Project 2) and TIA/EIA (Telecommunications Industry Association/Electronic Industries Association) IS-2000 standards, which provide a compatibility standard for cdma2000, including IS-2000 air interfaces and which standards are hereby incorporated herein in their entirety. The standards specify wireless telecommunications system operating protocols, including radio system parameters and call processing procedures. In communication system 100, the communication channels of forward link 130 or reverse link 135, such as access channels, control channels, paging channels, and traffic channels, comprise orthogonal codes, such as Walsh Codes, that are transmitted in a same frequency bandwidth. However, those who are of ordinary skill in the art realize that communication system 100 may operate in accordance with any wireless telecommunication system, such as but not limited to a Global System for Mobile Communications (GSM) communication system, a Time Division Multiple Access (TDMA) communication system, a Frequency Division Multiple Access (FDMA) communication system, or an Orthogonal Frequency Division Multiple Access (OFDM) communication system.

In order to maximize radio frequency (RF) bandwidth utilization, communication system 100 provides for a delaying a transfer of 'deferrable' data during high load or peak load periods, when bandwidth utilization is high, to off load periods when bandwidth utilization is low. Communication system 100 may further maximize capacity by having users that are in high RF cost environments defer their data transfers. Examples of high RF cost environments include users who require more power on the forward link and/or more soft handoff legs (more Walsh code, traffic channel modem and backhaul usage). By delaying the transmission of deferrable data, peak loads may be reduced and off peak bandwidth utilization may be improved.

Figure 2:
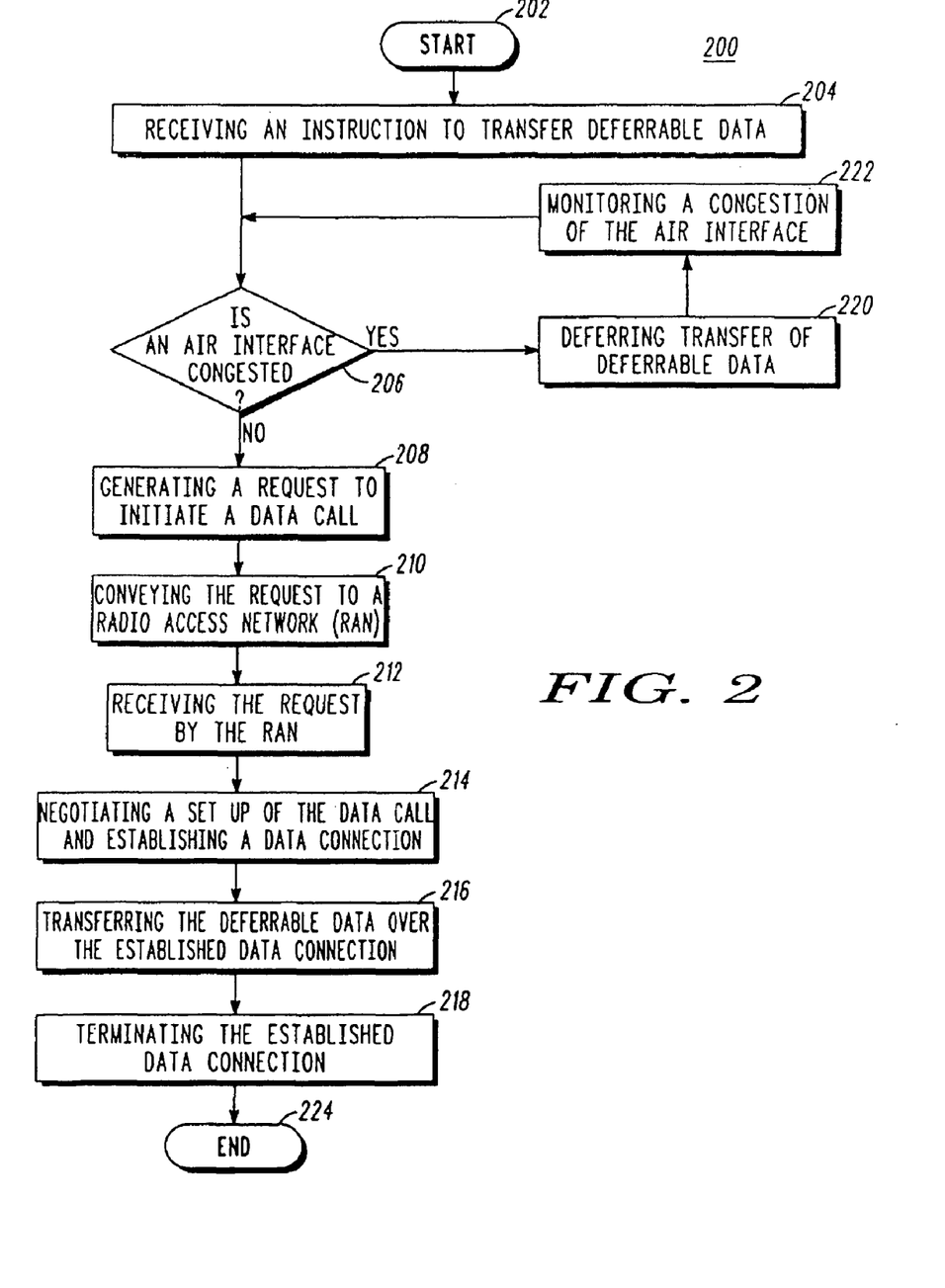
FIG. 2 is a logic flow diagram of a provision of deferrable data services by the wireless communication system of FIG. 1 in accordance with an embodiment of the present invention.

FIG. 2 is a logic flow diagram 200 illustrating a provision of deferrable data services by communication system 100 in accordance with an embodiment of the present invention. Logic flow diagram 200 begins (202) when MS 102 receives (204) an instruction to transfer deferrable data to or from infrastructure 110. For example, a user of MS 102 may compose an electronic mail (email) message and attach a lengthy document to the message, then instruct the MS to transfer the message and document by depressing a key on a keyboard of user interface 104 or by selecting an icon or text message in a display screen of the user interface. By way of another example, MS 102 may take a photograph, store the photograph in memory devices 108, and then receive an instruction to transfer the photograph, again by the user selecting an appropriate key, icon, or text message in user interface 104. By way of yet another example, MS 102 may receive a notification from infrastructure 110 that a download is pending or may receive an instruction from a user of the MS to download a file from the infrastructure. Infrastructure 110 may notify the MS of the pending download via a short message service (SMS) message or via a paging message conveyed to the MS via paging channel 131. By way of yet another example, MS 102 may have subscribed to certain news or other information service being delivered to its phone each day—prior to the users commute time.

Typically, communication systems such as communication system 100 initiate transfers of 'normal' data immediately upon receipt of a request for a transfer of the data. In contrast, the 'deferrable' data referred to herein, such as 'Background Class' data as defined in the 3GPP2 standards, can tolerate significant delays, for example delays as long as one (1) hour, before initiating a transfer of the data. This delay is different than simply identifying more delay tolerant traffic and then giving the identified traffic lower data rates. This delay concerns a delay of the actual initiation of a connection, that is, a radio frequency (RF) link. By delaying the initiation of a connection, communication system 100 is able to increase system capacity since, in a typical CDMA communication system, for every second that a connection (RF link) is held up approximately 3 kilobits per second (Kbps) of other users' bearer data is displaced.

In response to receiving the instruction, MS 102 determines (206) whether air interface 128 is congested, in which event transfers of deferrable data, that is, low priority data, are blocked, that is, not permitted. In one embodiment of the present invention, MS 102 determines whether air interface 128 is too congested by monitoring a forward link 130, preferably signaling channel 132, to determine whether the MS may transmit the deferrable data. In such an embodiment, RAN 112, preferably controller 116 via transceiver 114, transmits an overhead message 140 over signaling channel 132 that informs whether deferrable data may be transmitted by the MSs, such as MS 102, serviced by the RAN. Unless otherwise specified herein, the functions performed herein by MS 102 are performed by processor 106 of MS 102 and the functions performed herein by controller 116 are performed by processor 118 of controller 116.

Figure 3:
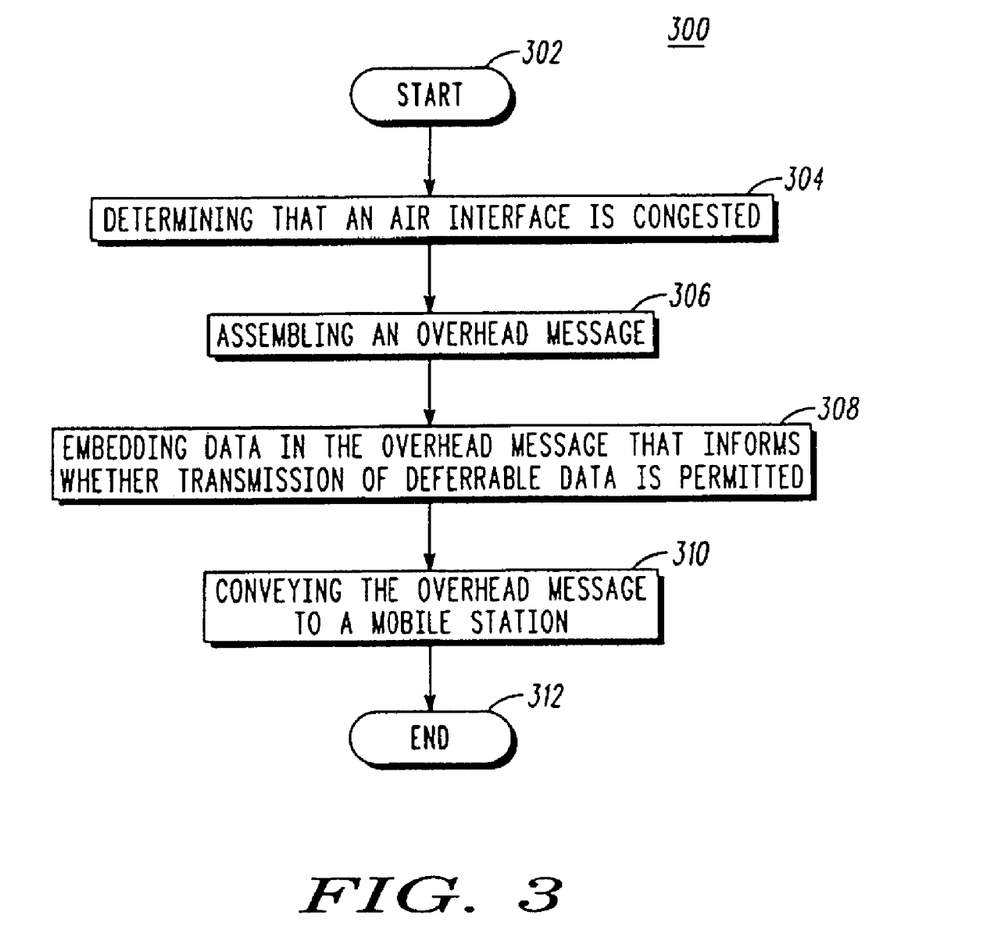
FIG. 3 is a logic flow diagram of a provision of an overhead message by a Radio Access Network of FIG. 1 to a mobile station of FIG. 1 in accordance with an embodiment of the present invention.

FIG. 3 is a logic flow diagram 300 of a provision of overhead message 140 by RAN 112 to MS 102 in accordance with an embodiment of the present invention. Logic flow diagram 300 begins (302) when RAN 112, preferably controller 116, determines (304) that air interface 128 is congested. For example, RAN 112 may determine that air interface 128 is congested based on a number of traffic channels currently assigned to MSs in the coverage area serviced by the RAN. By way of another example, RAN 112 may determine that air interface 128 is congested and/or in a higher RF cost location (power consuming) based on a signal quality metric, such as a signal-to-noise ratio (SNR), a carrier-to-interference ratio (C/I), a received signal strength, or a bit error ratio (BER), determined for signals received from each MS currently engaged in a communication session with the RAN. In yet another example, the signal quality metrics may be determined by each MS serviced by RAN 112 and then transmitted by the MS to the RAN. RAN 112, preferably controller 116, compares each determined signal quality metric to a corresponding signal quality metric threshold that is stored in one or more memory devices 120. When a designated number of determined signal quality metrics compare unfavorably with their corresponding signal quality metric thresholds, RAN 112, preferably processor 118, may determine that air interface 128 is congested. A quantity of assigned channels or unfavorable comparisons that constitutes congestion depends on system design, such as a size of a coverage area, a number of traffic channels available in a coverage area, and a location of the MSs in the coverage area, and may be determined based on a threshold set by a system designer and is not specified herein as it is not critical to the present invention.

Upon determining that air interface 128 is congested, RAN 112, preferably controller 116, assembles (306) overhead message 140. Overhead message 140 includes a deferrable data permission data field 142 that informs whether transmission of deferrable data is permitted. For example, in one embodiment of the present invention, overhead message 140 may comprise a modified access parameters message or a modified extended access parameters message. Access parameters messages are well-known in the art and are described in detail in the TIA/EIA IS-2000.5-A standard, sections 3.7.2.3.2.2 and 3.7.2.3.2.33. In communication system 100, an access parameters message or an extended access parameters message is modified to include a deferrable data permission data field 142, such as an ACCT (Access Control Based on Call Type) data field that is associated with deferrable data.

RAN 112, preferably controller 116, then embeds (308) a value in deferrable data permission data field 142 that informs whether transmission of deferrable data is permitted. Preferably, communication system 100 assigns a unique Service Option (SO) value to deferrable data service, such as an SO value of 0x801B, so that a bit embedded in deferrable data permission data field 142, such as an ACCT data field corresponding to SO 0x801B, informs MS 102 whether the MS is permitted to transmit deferrable data, that is, SO 0x801B data, to RAN 112. For example, an embedded value of '0' may inform that transmission of deferrable data is permitted and an embedded value of '1' may inform that transmission of deferrable data is not permitted, that is, is blocked. However, those who are of ordinary skill in the art realize that any unassigned Service Option value may be used herein in association with deferrable data without departing from the spirit and scope of the present invention.

RAN 112, preferably controller 116, then conveys (310) overhead message 140, via transceiver 114 and air interface 128, to MS 102 and logic flow 300 ends (312). By use of deferrable data permission data field 142, RAN 112 is able to block a transfer of deferrable data by MSs serviced by the RAN. By reference to deferrable data permission data field 142 of overhead message 140, MS 102 is then able to determine whether air interface 128 is congested with the result that transfers of deferrable data are not permitted, that is, are blocked.

Referring again to FIG. 2, in another embodiment of the present invention, instead of utilizing an overhead message, step 206 may comprise self-determining, by MS 102, whether air interface 128 is congested and transfers of deferrable data are blocked. In self-determining a congestion level of air interface 128, MS 102 determines a signal quality metric corresponding to the air interface. For example, MS 102 may determine a signal quality metric by determining any one or more of a signal-to-noise ratio (SNR), a carrier-to-interference ratio (C/I), a received signal strength, or a bit error ratio (BER) for signals received by the MS from RAN 112 via forward link 130, such as pilot signals or control signals. Many signal quality metrics are known in the art and those who are of ordinary skill in the art realize that any such signal quality metric may be used herein without departing from the spirit and scope of the present invention.

MS 102 then compares the determined SNR, C/I, received signal strength, or BER to a corresponding signal quality threshold, such as a corresponding SNR, C/I, received signal strength, or BER threshold, stored in memory devices 108 of the MS. When the determined signal quality metric compares unfavorably with the corresponding threshold, then the MS may assume that air interface 128 is congested and transfers of deferrable data are blocked. When the determined signal quality metric compares favorably with the corresponding threshold, then the MS may assume that air interface 128 is not congested and that the MS may transmit deferrable data over the air interface.

When MS 102 determines (206) that air interface 128 is not congested, for example that deferrable data is not blocked or a determined signal quality metric compares favorably with a corresponding threshold, MS 102 generates (208) and conveys (210) to infrastructure 110 a request to initiate a data call. Preferably, the request comprises a call origination message, preferably a Layer 3 call origination message that includes a Service Option (SO) data field in which MS 102 embeds an SO value associated with the data call. In one embodiment of the present, MS 102 embeds a SO value corresponding to a traditional data call, that is, '0x0021,' in the SO data field. In another embodiment of the present, MS 102 embeds a SO value corresponding to a deferrable data call, such as a value of 0x801B, in the SO data field. MS 102 then conveys the call origination message to infrastructure 104 via reverse link access channel, that is, access channel 136. Call origination messages are used by an MS to establish a connection with an infrastructure, are well-known in the art, and are described in detail in the TIA/EIA IS-2000.5-A standard, section 2.7.1.3.2.4 and 2.7.1.3.2.5.

Upon receiving (212) the request to initiate a data call, infrastructure 110, preferably controller 116 of RAN 112, negotiates (214) a set up of a data call and establishes a data connection with MS 102, including an RF link over a forward link traffic channel 133 if data is being transferred from infrastructure 110 to MS 102 or over a reverse link traffic channel 138 if data is being transferred from MS 102 to infrastructure 110, in accordance with well-known call set up procedures. The deferrable data is then transferred (216) by MS 102 to infrastructure 110 or by infrastructure 110 to MS 102 over the established data connection and the logic flow ends (224).

In another embodiment of the present invention, in order to minimize a loading of air interface 128, MS 102 and RAN 112 may further terminate (218), that is, tear down, the established RF link nearly immediately after conveying the deferrable data. In such an embodiment, MS 102 and/or RAN 112 may include a respective inactivity timer 109, 122 that is respectively coupled to processor 106 and controller 116. Upon conveyance of the deferrable data by MS 102 or RAN 112, the conveyor 102, 112 of the data starts respective inactivity timer 109, 122. Upon expiration of a short, predetermined inactivity time period after completion of the transfer of the deferrable data, that is, a time period during which the conveyor of data does not receive or convey any further data, as determined by the conveyor's processor 106, 118 with reference to the respective inactivity timer 109, 122, the conveyor initiates a termination, that is, a tear down, of the established RF link.

When MS 102 determines (206) that air interface 128 is congested, for example, that deferrable data is blocked or a determined signal quality metric compares unfavorably with a corresponding threshold, the MS delays, that is, defers, (220) transfer of the data and continues to monitor (222) air interface 128. Upon continued monitoring, when MS 102 determines (206) that air interface 128 is no longer congested, and correspondingly that transfers of deferrable data are permitted, the MS generates (208) and conveys (210) to infrastructure 100 a request to initiate a data call. Upon receiving (212) the request, infrastructure 110, preferably RAN 112, negotiates (214) a set up of a data call and establishes a data connection with MS 102 in accordance with well-known call set up procedures. The deferrable data is then transferred (216) by MS 102 to infrastructure 110 or by infrastructure 110 to MS 102 over the established data connection and the logic flow ends (224).

In one embodiment of the present invention, wherein MS 102 monitors signaling channel 132 for overhead message 140, when the MS determines (206) that air interface 128 is congested then the MS continues to monitor the signaling channel 132 for subsequent overhead messages 140 intended for the MS. Based on each subsequent overhead message, MS 102 determines whether deferrable data continues to be blocked. In order to conserve battery power, the MS may suspend receiving messages and/or monitoring of air interface 128 (for example, go to sleep) after receiving and interpreting an overhead message 140 blocking deferrable data, and later resume receiving messages and/or monitoring of air interface 128 (for example, wake up) in order to receive and interpret a subsequent overhead message 140. However, the present invention does not require that the MS suspend receiving and/or monitoring between messages, or that the MS receive each message until deferrable data becomes unblocked.

In another embodiment of the present invention, wherein MS 102 determines that air interface 128 is congested based on signal quality metrics, when the MS determines (206) that air interface 128 is congested then the MS continues to determine signal quality metrics with respect to signals received by the MS from RAN 112. MS 102 then compares each determined signal quality metric to the corresponding signal quality threshold. So long as the determined signal quality metric compares unfavorably with the corresponding threshold, MS 102 may continue to assume that air interface 128 is congested and that transfers of deferrable data are blocked. Similar to the determination of congestion based on overhead message 140, in order to conserve battery power, the MS may suspend receiving messages and/or monitoring of air interface 128 after receiving each such signal and determining, based on the received signal, that air interface 128 continues to be congested. MS 102 may subsequently resume receiving messages and/or monitoring of air interface 128 in order to receive and interpret a succeeding signal.

By deferring a transfer of 'deferrable' data when air interface 128 is congested, MS 102 defers a transfer of 'deferrable' data from high load or peak load periods, when bandwidth utilization is high or when RF costs are high, to off load periods when bandwidth utilization is low. By deferring a transfer of 'deferrable' data during high load or peak load periods, peak loads may be reduced and off peak bandwidth utilization may be improved. In one embodiment of the present invention, MS 102 determines whether to defer a transfer of 'deferrable' data based on an overhead message 140 received by the MS from infrastructure 110, which overhead message informs whether a transfer of deferrable data is blocked. In another embodiment of the present invention, MS 102 determines whether to defer a transfer of 'deferrable' data based on a self-determination of air interface 128 congestion, preferably by determining a signal quality metric for a received signal and comparing the determined metric to a corresponding signal quality metric threshold. In this case where the MS detects a poor RF environment, the RF costs of initiating the transfer are much larger than they would be if the MS were in a better RF location. For example, if MS 102 is close to an infrastructure tower for a given transceiver 114, the RF costs or power required are smaller. Additionally, when the MS is at a given distance from a nearest infrastructure tower associated with a transceiver 114 and the bandwidth utilization increases, then the power and RF costs of immediately initiating the data transfer increase. Upon determining to defer a transfer of 'deferrable' data, MS 102 continues to monitor air interface 128 so that the MS may transfer the 'deferrable' data when the congestion is alleviated. In order to conserve battery power, MS 102 may intermittently, instead of continuously, monitor air interface 128 or receive messages.

Figure 4:
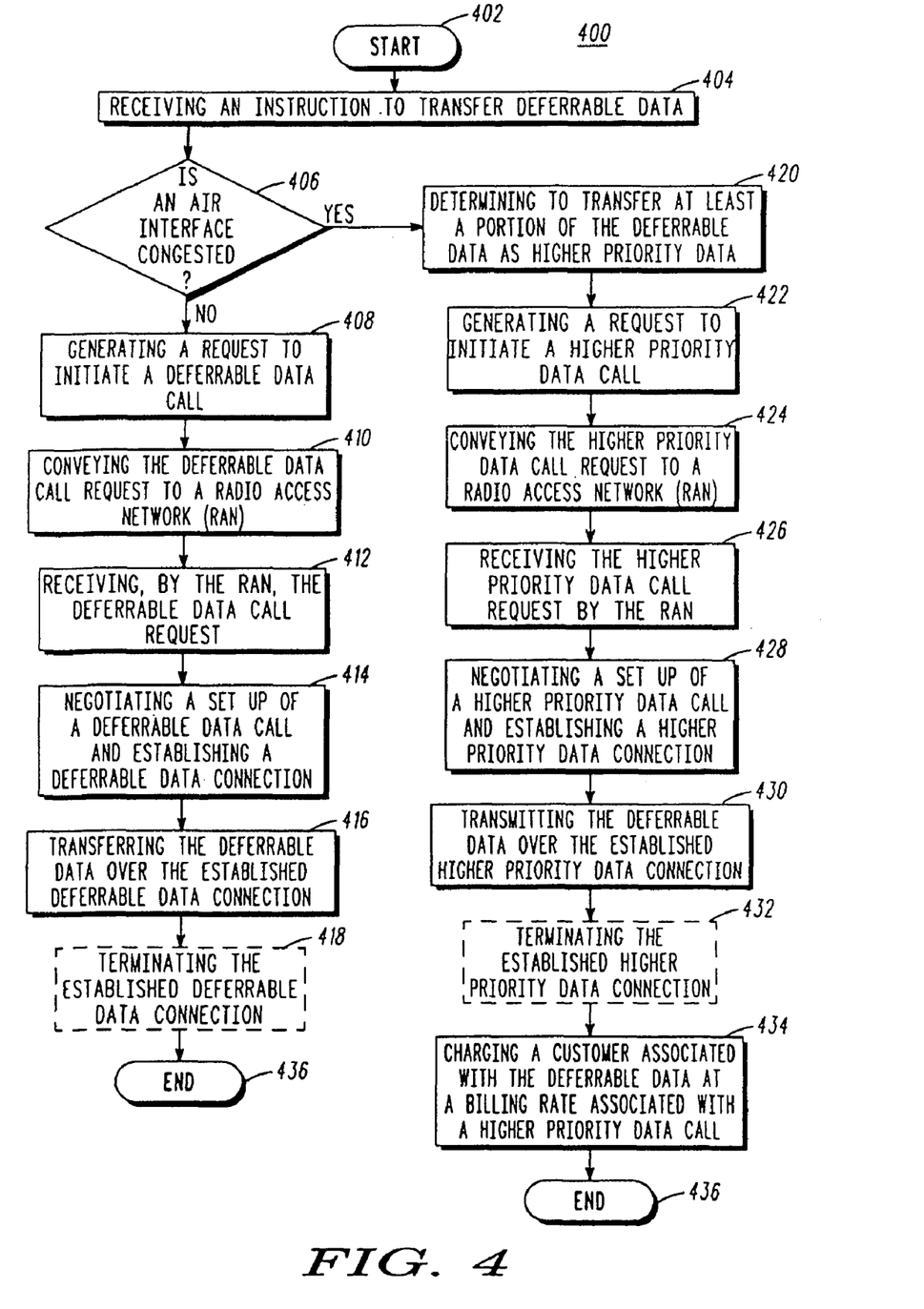
FIG. 4 is a logic flow diagram of a provision of deferrable data services by the wireless communication system of FIG. 1 in accordance with another embodiment of the present invention.

In yet another embodiment of the present invention, instead of deferring a transfer of the data, when MS 102 determines that air interface 128 is congested and that transfers of deferrable data are blocked, the MS may decide to transfer the data as higher priority data instead of deferring the data call. For example, MS 102 may decide to transfer the deferrable data as SO 0x0021 data when the data might otherwise be transferred as SO 0x801B data. Referring now to FIG. 4, a logic flow diagram 400 is provided that illustrates a provision of deferrable data services by communication system 100 in accordance with another embodiment of the present invention. Similar to logic flow diagram 200, logic flow diagram 400 begins (402) when MS 102 receives (404) an instruction to transfer deferrable data to or from infrastructure 110. In response to receiving the instruction, MS 102 determines (406) whether air interface 128 is congested.

When MS 102 determines (406) that air interface 128 is not congested, for example that a transfer of deferrable data is not blocked or that a determined signal quality metric compares favorably with a corresponding threshold, MS 102 generates (408) and conveys (410) to infrastructure 110 a request to initiate a deferrable data call. Preferably, the request comprises a call origination message, preferably a Layer 3 call origination message that includes a Service Option (SO) data field in which MS 102 embeds an SO value, such as SO 0x801B, that informs that a deferrable data call is requested. Upon receiving (412) the request to initiate a deferrable data call, controller 116 negotiates (414) a set up of a deferrable data call with MS 102 and establishes a deferrable data connection with MS 102, including an RF link over a forward link traffic channel 133 if data is being conveyed from infrastructure 110 to MS 102 or over a reverse link traffic channel 138 if data is being conveyed from MS 102 to infrastructure 110. The call is billed to a customer associated with MS 102 at a billing rate associated with a deferrable data call. The deferrable data is then transferred (416) by MS 102 to infrastructure 110 or by infrastructure 110 to MS 102 over the established deferrable data connection and the logic flow ends (436).

Similar to logic flow diagram 200, in another embodiment of the present invention, in order to minimize a loading of air interface 128, MS 102 and RAN 112 may further terminate (418) the established RF link nearly immediately after conveying the deferrable data. In such an embodiment, upon completion of the transfer of the deferrable data by MS 102 or RAN 112, the conveyor 102, 112 of the data starts respective inactivity timer 109, 122. Upon expiration of a short, predetermined inactivity time period after completion of the transfer of the deferrable data, that is, expiration of a predetermined time period without receiving or conveying any data, determined by the conveyor's processor 106, 118 with reference to the respective inactivity timer 109, 122, the conveyor initiates a termination, that is, a tear down, of the established RF link.

Unlike logic flow diagram 200, in logic flow diagram 400, when MS 102 determines (406) that air interface 128 is congested, for example that a transfer of deferrable data is blocked or that a determined signal quality metric compares unfavorably with a corresponding threshold, instead of deferring a transfer of the data, the MS may decide (420) to transfer at least a portion of the deferrable data as higher priority data, for example, as SO 0x0021 data, whose transfer is permitted. In order to encourage a user of MS 102 to not transfer all deferrable data as higher priority data and to instead defer a transfer of deferrable data from a period of congestion to an off load period, communication system 100 may provide economic incentives for an MS to transfer deferrable data as lower priority data. For example, communication system 100 may include a billing system wherein a higher billing rate is associated with transfers of higher priority data.

Figure 5:
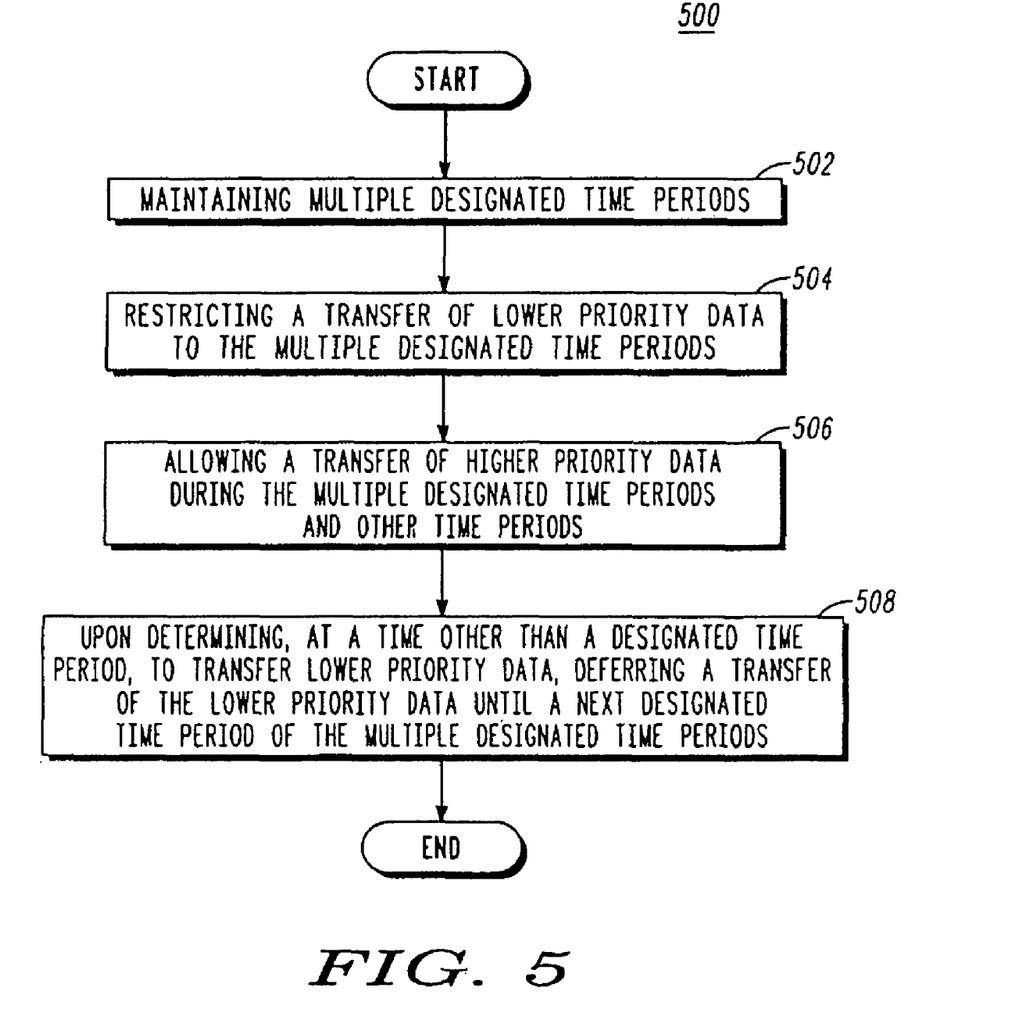
FIG. 5 is a logic flow diagram of a provision by the communication system of FIG. 1 of restrictions on a transfer of deferrable data in accordance with an embodiment of the present invention.

Communication system 100 may also implement restrictions that discourage a user of an MS from transferring higher priority data as lower priority, deferrable data during off load periods. For example, FIG. 5 is a logic flow diagram 500 illustrating a provision, by communication system 100, of restrictions on a transfer of deferrable data in accordance with an embodiment of the present invention. As depicted by logic flow diagram 500, communication system 100, preferably controller 116 infrastructure 110 although MS 102 may self-impose data transfer restrictions based on information stored in the MS's memory devices 108, restricts (504) a transfer of lower priority data, such as deferrable data, to a designated time period of multiple designated time periods. Meanwhile, communication system 100, preferably controller 116 infrastructure 110, allows (504) a transfer of higher priority data during the multiple designated time periods and, in addition, other time periods. For example, communication system 100 may not impose any time restrictions on a transfer of higher priority data. By way of another example, communication system 100 may restrict MS 102 to transferring deferrable data only at designated times during an hour, which times are known to both the MS and infrastructure 110 and are maintained (502) in their respective memory devices 108, 120. Infrastructure 110, preferably processor 118 of controller 116, can then reject requests to transfer deferrable data at times other than the designated times.

When an MS, such as MS 102, determines to transfer lower priority data at a time other than a designated time period, the MS may have to wait at least until a next designated time before the data may be transferred, that is, the MS 102 may have to defer (508) transferring the lower priority data until a next designated time period. A benefit of restricting a transfer of deferrable data to designated time periods during a day is that off peak traffic that wants to be transferred immediately will still have to pay the higher cost for the service and that only genuinely deferrable data will get a lower billing rate associated with a transfer of such data.

In implementing such time restrictions, communication system 100 may provide that billing system 150 can only give a lower rate to transfers that are initiated at times that are designated in association with the particular MS. That is, an MS may be assigned designated times during which the MS may transfer lower priority, deferrable data. The designated times are stored in association with an identifier of the MS, such as an IMSI, in a profile of the MS, which profile is stored in an MS database 124 that is included in or operably coupled to controller 116 of RAN 112. By implementing a billing scheme whereby a user of an MS is billed for data transfers at a lower, deferrable data rate only when the transfers occur during designated times of the day, communication system 100 can bill at the lower rate—for deferrable calls only—without implementing an SO 0x801B data Service Option.

When an MS decides (420) to transfer deferrable data, such as SO 0x801B data, as higher priority data, such as SO 0x0021 data, then MS 102 generates (422) and conveys (424) to infrastructure 100 a request to initiate a higher priority data call, for example, an SO 0x0021 data call. Preferably, the request comprises a call origination message, preferably a Layer 3 call origination message that includes a Service Option (SO) data field in which MS 102 embeds an SO value, for example, SO 0x0021, that informs that a higher priority data call is requested. Upon receiving (426) the request to initiate a higher priority data call, RAN 112 negotiates (428) a set up of a higher priority data call with MS 102 in accordance with well known call set up procedures and establishes a higher priority data connection, including an RF link over a forward link traffic channel 133 if data is being conveyed from infrastructure 110 to MS 102 or over a reverse link traffic channel 138 if data is being conveyed from MS 102 to infrastructure 110. At least a portion of the deferrable data is then transferred (430) by MS 102 to infrastructure 110 or by infrastructure 110 to MS 102 over the higher priority data connection and communication system 100 charges (434) a customer associated with the MS a higher billing rate that is associated with higher priority data for a transfer of the at least a portion of the deferrable data. Logic flow 400 then ends (436). Again, in another embodiment of the present invention, in order to minimize a loading of air interface 128, MS 102 and RAN 112 may further terminate (432) the established RF link upon expiration of a short, predetermined inactivity period after completion of the transfer of the deferrable data.

For example, suppose MS 102 determines (406) that air interface 128 is congested and a transfer of deferrable data is not permitted. Further, suppose that, as a result, MS 102 determines to transmit the data as higher priority data whose transmission is permitted. When MS 102 sets up a data connection with infrastructure 110 for a transfer of the data, the MS informs the infrastructure that this is a higher priority data connection as opposed to a deferrable data connection. For example, when MS 102 sets up a deferrable data connection during non-congested time periods, the MS may embed an SO value of 0x801B in a call origination message and when MS 102 determines to initiate the deferrable data call as higher priority data during a congested time period, the MS may embed an SO value of 0x0021 in the call origination message. Based on the SO value embedded in the call origination message, infrastructure 110 then informs billing system 150 of the priority of the data or of a corresponding billing rate. Billing system 150 can then appropriately charge a customer associated with the MS for the priority of the data service provided to the customer.

In order to encourage users of MSs to transfer deferrable data during off load periods, communication system 100 may provide pricing differentiation for deferrable data calls versus higher priority data calls on one or more of a variety of bases. For example, a customer associated with MS 102 may be billed at a higher, 'normal' data, billing rate on an ad hoc basis, whenever a user of the MS decides to transfer deferrable data as higher priority data. In one such embodiment, a determination of an appropriate billing rate may be based on the type of data connection established, that is, whether the connection is a 'deferrable' data connection, for example, an SO 0x801B connection, or a 'normal' data connection, for example, an SO 0x0021 connection. In another such embodiment, the determination of an appropriate billing rate may be based on a quality of service (QoS) requested for the data being transferred. When the data being conveyed is deferrable data, MS 102 may request a lower QoS, which lower QoS corresponds to a lower billing rate than a billing rate associated with a higher QoS. As described in greater detail below, MS 102 may request the lower QoS, in addition to or instead of using an SO value to identify the connection as a deferrable data connection, when setting up the data connection. Alternatively, MS 102 may convey QoS messages to RAN 112 during the deferrable data call over a reverse link traffic channel 138 assigned to the MS. When infrastructure 110 receives the QoS messages, the infrastructure provides the corresponding billing information to billing system 150. As also described in greater detail below, RAN 112 may request the lower QoS, in addition to or instead of using an SO value, to identify the connection as a deferrable data connection when setting up the data connection. Alternatively, RAN 112 may convey QoS messages to MS 102 during the deferrable data call over forward link 130.

By way of another example, communication system 100 may provide pricing differentiation by providing multiple deferrable data subscription packages. Each package of the multiple subscription packages is associated with a different price and allows an MS, such as MS 102, to transfer a different quantity of deferrable data when system 100 is congested. For example, a first, most expensive package may allow the MS to transfer all deferrable data at any level of system congestion. A second, less expensive package may allow the MS to transfer only seventy-five percent (75%) of the MS's deferrable data when system 100 is congested. And a third, even less expensive package may allow the MS to transfer only twenty-five percent (25%) of the MS's deferrable data when system 100 is congested. Information concerning the user's subscription package may be provisioned to the MS and stored in the MS's memory devices 108, and the processor 106 of the MS may then determine, by reference to memory devices 108, how much deferrable data may be transferred when the MS determines that air interface 128 is congested.

By providing economic incentives for system users, such as a user of MS 102, to defer a transfer of 'deferrable' data when air interface 128 is congested, communication system 100 may leave a determination of whether to transfer the lower priority data when air interface 128 is congested up to each user. The user may decide to defer transferring the data, or may decide to transfer the data as higher priority, and correspondingly higher priced, data. Preferably, MS 102 indicates whether a data call is a lower priority data call or a higher priority data call when the MS sets up the call, which priorities may be indicated by a conveyed SO value or by a QoS parameter that is described in greater detail below. If the incentives are properly determined, system 100 can still reduce congestion during high load or peak load periods, improve bandwidth utilization, and increase system profitability.

Communication system 100 may further provide for deferrable data call prioritization in order to avoid overloading system 100 with deferrable data once system congestion is alleviated. In one embodiment of deferrable data call prioritization, each package of the multiple deferrable data subscription packages may also provide for a prioritizing of the deferrable data, that is, may provide an amount of time that an MS must defer transferring deferrable data once system congestion is alleviated. For example, the higher the price of the package, the higher the package's deferrable data prioritization, that is, the shorter the deferral period. In another embodiment of deferrable data prioritization, each MS that has had to defer transferring deferrable data during a period of system congestion may, upon alleviation of the system congestion, defer transferring the deferrable data for a period of time that is inversely proportional to a quantity of time that the MS has been waiting to transfer the data. That is, the longer that the MS has had to delay transferring the deferrable data, the shorter the deferral period before the MS may transfer the deferrable data after system congestion is alleviated. An algorithm concerning the deferral period may be stored in the MS's memory devices 108 and referenced by the MS's processor 106 in determining a deferral period.

Figure 6A:
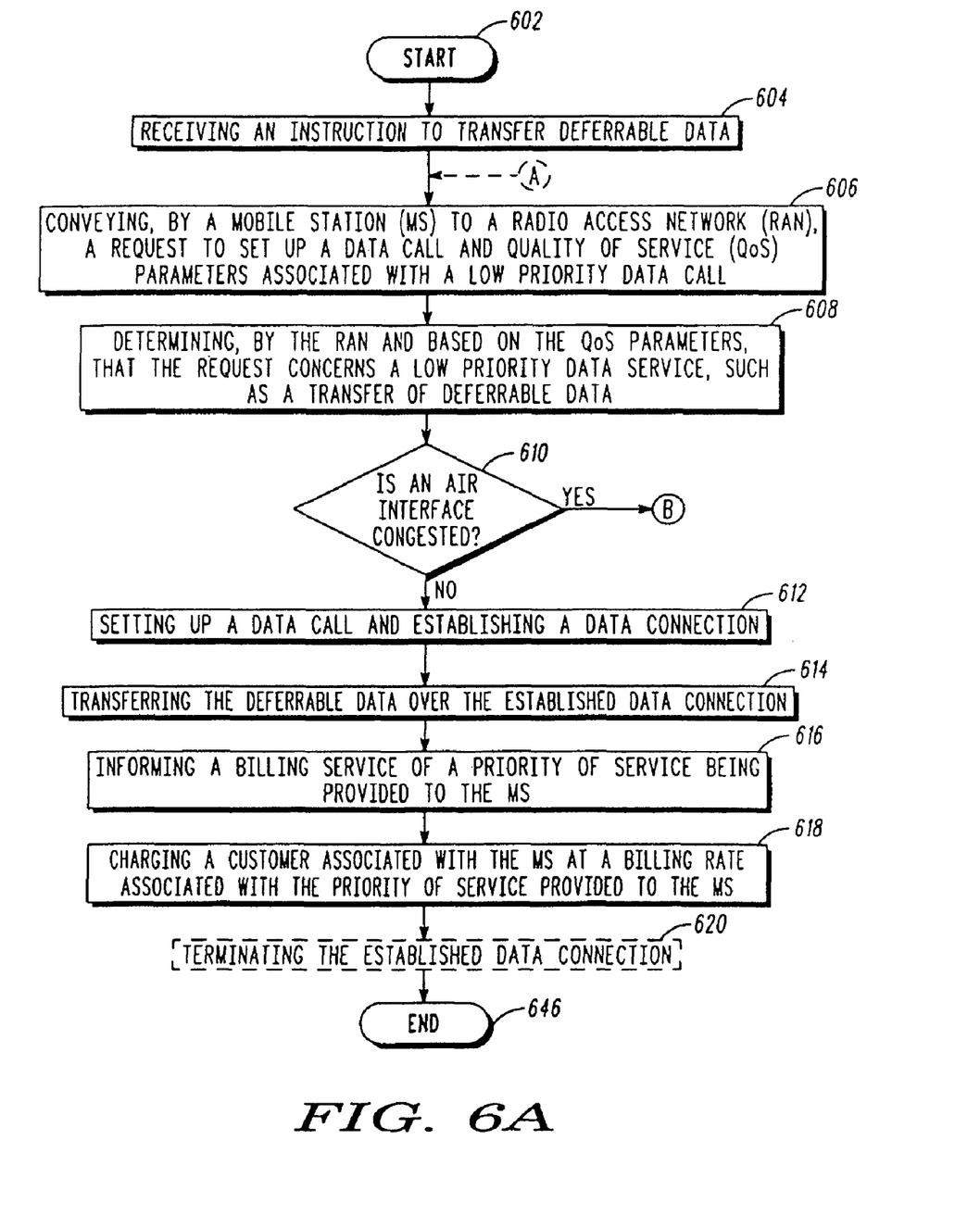
FIG. 6A is a logic flow diagram of a process by which the communication system of FIG. 1 processes a deferrable data call in accordance with another embodiment of the present invention.
Figure 6B:
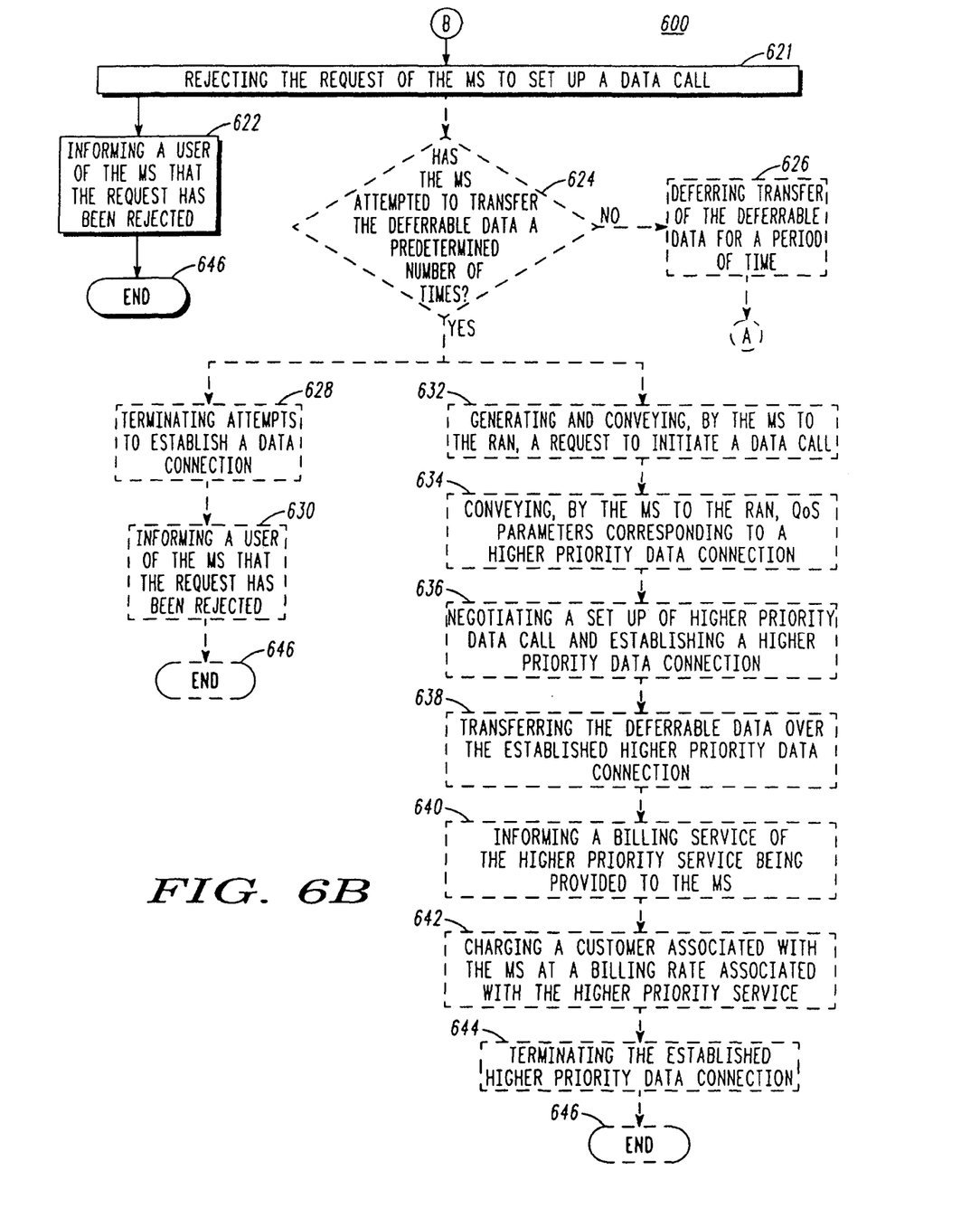
FIG. 6B is a continuation of the logic flow diagram of FIG. 6A of a process by which the communication system of FIG. 1 processes a deferrable data call in accordance with another embodiment of the present invention.

In yet another embodiment of the present invention, communication system 100 may use quality of service (QoS) measurements, instead of a 'deferrable data' data field, to set up and process a deferrable data call. FIGS. 6A and 6B depict a logic flow diagram 600 of a process by which communication system 100 processes a deferrable data call in accordance with another embodiment of the present invention. Logic flow diagram 600 begins (602) when MS 102 receives (604) an instruction to transfer deferrable data to or from infrastructure 110. In response to receiving the instruction, MS 102 conveys (606) to RAN 112 a request to set up a data call and QoS parameters. The QoS parameters may be included in the request or may be conveyed separate from the request.

When MS 102 is setting up a deferrable data call, the MS conveys, to RAN 112, a first set of QoS parameters that correspond to a low priority data service, such as a non-assured mode call. The QoS parameters may be included in a request to set up the call, such as a call origination message, or may be included in a subsequent message exchanged between the MS and RAN 112 as part of a negotiation of services, such as a service negotiation message. Preferably, the QoS parameters are included in a QoS Block of Bytes (BLOB) in the request or subsequent message. QoS BLOB is well-known in the art and is described in greater detail in the IS-2000 & IS-707 standards. Based upon the QoS parameters, RAN 112, preferably controller 116, determines (608) that the request concerns a low priority data service, such as a deferrable data call, as opposed to an urgent data transfer. RAN 112 further determines (610) whether air interface 128 is congested.

When air interface 128 is not congested, RAN 112 then sets up (612) a data call and establishes a data connection with MS 102, including an RF link over a forward link traffic channel 133 if data is being conveyed from infrastructure 110 to MS 102 or over a reverse link traffic channel 138 if data is being conveyed from MS 102 to infrastructure 110 in accordance with well-known call set up procedures. The deferrable data is then transferred (614) by MS 102 to RAN 112 or by RAN 112 to MS 102 over the established data connection. RAN 112 further informs (616) billing system 150, via support node 126, of the priority of service being provided to MS 102. For example, RAN 112 may simply forward at least a portion of the QoS BLOB to billing system 150, based upon which the billing system may determine that the service provided is a low priority service. Billing system 150 can then charge (618) the customer associated with MS 102 at a lower billing rate associated with the low priority data service. Logic flow 600 then ends (646). In addition, when MS 102 or RAN 112 determines, by reference to a respective inactivity timer 109, 122, that a short, predetermined inactivity time period expires without receiving or conveying any data, the MS or the RAN may further terminate (620) the established RF link nearly immediately, that is, after expiration of a short inactivity time period after completion of the transfer of the deferrable data.

When air interface 128 is congested, RAN 112 rejects (621) the request of MS 102 to set up the data call based on the QoS parameters. Upon being informed that the request is rejected, MS 102 may defer or terminate attempts to effectuate a transfer of the data or may attempt to transfer the data as higher priority data. In one embodiment of the present invention, upon being informed that the request is rejected, the MS informs (622) a user of the MS, via a message in a display screen of user interface 104, that the request has been rejected, and the logic flow ends (646). In another embodiment of the present invention, upon rejection of the request, MS 102 defers (626) attempting to transfer the deferrable data for a period of time that may be predetermined or randomly determined and then returns to step 506, wherein the MS again conveys, to RAN 112, a request to initiate the low priority data call. After conveying (624) a predetermined number of unsuccessful requests, MS 102 may assume that a low priority data connection cannot be established and may terminate (628) attempts to establish a connection. MS 102 may then inform (630) a user of the MS, via a message in a display screen of user interface 104, that the request has been rejected.

In yet another embodiment of the present invention, after conveying (624) a predetermined number of unsuccessful requests, instead of terminating attempts to transfer the data, MS 102 may decide to transfer the deferrable data as higher priority, higher priced data. MS 102 generates and conveys (632) to RAN 112 a request to set up a data call and further conveys (634) to the RAN a second set of QoS parameters that correspond to a higher priority data service, such as an assured mode call. Based on the second set of QoS parameters, RAN 112 and MS 102 then negotiate (636) a set up of a higher priority data call, that is, a higher QoS data call, and establish a higher priority, that is, a higher QoS, data connection, including a reverse link or forward link RF link 133, 138. MS 102 then transfers (638) the deferrable data over the higher priority data connection.

RAN 112 also informs (640) billing system 150, via support node 126, of the higher priority, that is, higher QoS, service being provided to MS 102. Billing system 150 may then charge (642) a customer associated with MS 102 at a billing rate associated with the higher priority service, which billing rate is higher than a billing rate associated with the lower priority service. In addition, when MS 102 or RAN 112 determines, by reference to a respective inactivity timer 109, 122, that a short, predetermined inactivity time period expires after completion of the transfer of the deferrable data, that is, expires without receiving or conveying any data, the MS or the RAN may further initiate a termination (644) of the established RF link nearly immediately after transferring the deferrable data. Logic flow 600 then ends (646)

By using QoS parameters to establish a priority of a data call and a corresponding billing rate, communication system 100 allows RAN 112 to determine whether to block a particular call during periods of air interface 128 congestion and allows MS 102 to transfer deferrable data that has been blocked as higher priority data without a need for a 'deferrable' data SO value. The QoS parameters can also be used by communication system 100 to determine an appropriate billing rate for the data transferred by MS 102, again without the need for a 'deferrable' data SO value.

Figure 7:
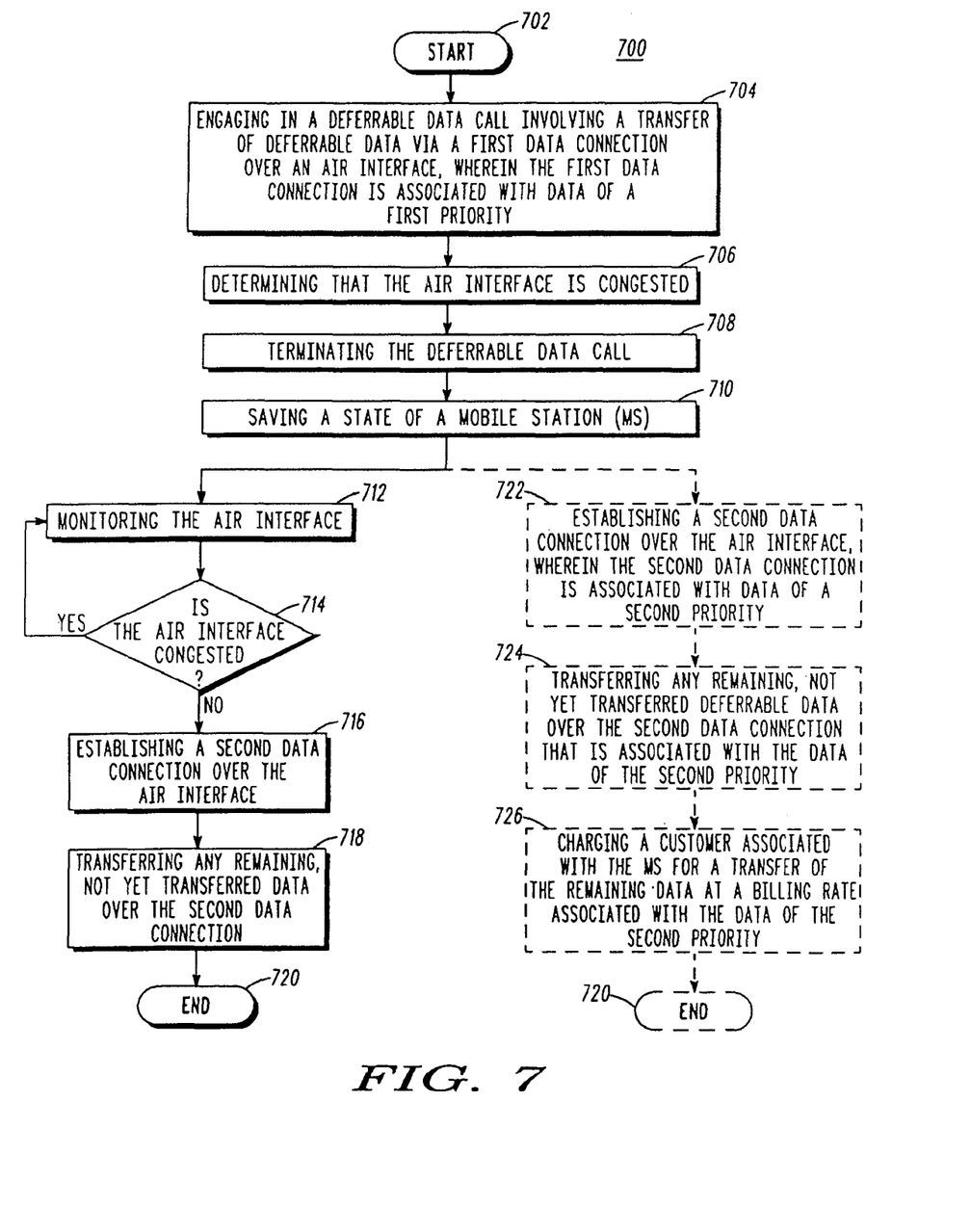
FIG. 7 is a logic flow diagram of an early termination process executed by the communication system of FIG. 1 in accordance with another embodiment of the present invention.

In still another embodiment of the present invention, communication system 100 may provide for an early termination of a deferrable data call upon a determination, subsequent to an initiation of the call, that air interface 128 is congested. FIG. 7 is a logic flow diagram 700 of a communication system 100 early termination process in accordance with another embodiment of the present invention. Logic flow diagram 700 begins (702) when MS 102 engages (704) in a transfer of deferrable data to or from RAN 112 via a first data connection over air interface 128. The deferrable data is data of a first priority, which first priority is associated with the first data connection and is indicated by MS 102 to the RAN 112 when the data connection is established. In one embodiment of the present invention, MS 102 informs RAN 112 of the priority associated with the first data connection via a request to initiate a data call, such as a call origination message in which the MS embeds an SO value associated with a 'deferrable' data call, or during service negotiations to set up the call. In another embodiment of the present invention, MS 102 informs RAN 112 of the priority associated with the data connection by conveying, to the RAN, messages that include a first set of QoS parameters. The first set of QoS parameters correspond to a first priority, that is, a lower priority, data call such as a 'deferrable data' call, as opposed to a higher priority data call, such as a 'normal' data call.

During the course of the data call, either RAN 112, preferably controller 116, or MS 102 determines (706) that air interface 128 has become congested. Upon determining that air interface 128 is congested, the deferrable data call is terminated (708). In one embodiment of the present invention, when RAN 112 determines air interface 128 is congested, the RAN, preferably controller 116, conveys a message, for example a traffic channel message such as an SMS/SDB (Short Data Burst) message that is conveyed over a forward link traffic channel 133 or a control message conveyed to the MS over a forward link signaling channel 132, to MS 102 informing the MS that air interface 128 is congested. Upon receipt of the message, MS 102 terminates the data call by initiating a termination of the first data connection. In another embodiment of the present invention, MS 102 may self-determine that air interface 128 is congested and terminate the data call by initiating a termination of the first data connection. In addition, MS 102 saves (710) the state of the deferrable data transfer in the MS's memory devices 108.

In one embodiment of the present invention, after terminating the first data connection, MS 102 may defer transferring any remaining, not yet transferred deferrable data until the MS determines that air interface 128 is no longer congested. In such an embodiment, after terminating the first data connection, MS 102 monitors (712) air interface 128 to determine (714) if the air interface continues to be congested. In one embodiment, MS 102 may monitor for congestion by monitoring an air interface signaling channel 132 for overhead messages 140 that inform whether deferrable data is blocked, as described above in greater detail. Based on each received overhead message, MS 102 determines whether deferrable data continues to be blocked. In another such embodiment, MS 102 may monitor for congestion by determining signal quality metrics for signals received by the MS over air interface 128, as described above in greater detail. MS 102 then compares each determined signal quality metric to a corresponding signal quality threshold. So long as the determined signal quality metric compares unfavorably with the corresponding threshold, MS 102 may continue to assume that air interface 128 is congested and that transfers of deferrable data are blocked.

When MS 102 determines that air interface 128 is no longer congested, the MS establishes (716) a second data connection over air interface 128. Preferably, the second data connection is of a same priority, and associated with a same billing rate, as the first data connection. Upon establishing the second data connection, MS 102, preferably processor 106 with reference to the state saved in memory device 108, then transfers (718) any remaining, not yet transferred deferrable data to or from RAN 112 over the second data connection. The logic flow then ends (720).

In another embodiment of the present invention, after terminating the first data connection, instead of deferring a transfer of any remaining, not yet transferred deferrable data, MS 102 may transfer the remaining deferrable data as higher priority, more expensive data. In such an embodiment, after terminating the first data connection, MS 102 establishes (722) a second data connection over air interface 128 that is associated with data of a second, higher priority. In one such embodiment, MS 102 may inform RAN 112 of the priority associated with the second data connection via a request to initiate a data call, such as a call origination message in which the MS embeds an SO value associated with a higher priority data call, such as a 'normal' data call, or during service negotiations to set up the call. In another embodiment of the present invention, MS 102 informs RAN 112 of the priority associated with the data connection by conveying, to the RAN, messages that include a second set of QoS parameters, that is, the parameters corresponding to a higher priority data call, as opposed to the QoS parameters corresponding to a deferrable data call.

Upon establishing the second, higher priority data connection, MS 102, preferably processor 106 with reference to the state saved in memory device 108, then transfers (724) any remaining, not yet transferred deferrable data to or from RAN 112 over the second data connection. When the remaining deferrable data is transferred over the higher priority data connection, communication system 100 charges (726) a customer associated with the MS for the transfer of such data at a higher priority data billing rate, as is described above in greater detail. The logic flow then ends (720).

By providing for an early termination of a deferrable data call upon a determination, subsequent to an initiation of the call, that air interface 128 is congested, communication system 100 is further able to shift lower priority, deferrable data from high load or peak load periods, when bandwidth utilization is high, to off load periods when bandwidth utilization is low. By blocking, or encouraging system users to defer, a transfer of 'deferrable' data during high load or peak load periods, peak loads may be reduced and off peak bandwidth utilization may be improved. Communication system 100 encourages system users to defer a transfer of 'deferrable' data during high load or peak load periods by providing incentives for system users not to transfer deferrable, lower priority data as higher priority data during such periods, and further provides incentives for users not to transfer high priority data as less expensive, lower priority data during periods when the system is not congested.

An MS, such as MS 102, may determine whether the MS is permitted to transfer lower priority, deferrable data based on a system overhead message 140 received by the MS or based on a self-determination by the MS of system congestion. The MS may also attempt to set up a low priority call and then be blocked by infrastructure 110 from setting up the call during a period of congestion. When the MS is blocked from transferring deferrable data, the MS may defer a transfer of the data or may transfer the data as higher priority data. The MS may indicate the latter via an SO value or one or more QoS parameters conveyed to infrastructure 110 when setting up the call. Based on the received SO value or one or more QoS parameters, infrastructure 110 is then able to determine an appropriate billing rate for the call. Infrastructure 110 may also determine an appropriate billing rate based on a time period, such as a time during an hour, during which data is transferred without a need to use an SO value or a QoS parameter.

While the present invention has been particularly shown and described with reference to particular embodiments thereof, it will be understood by those skilled in the art that various changes may be made and equivalents substituted for elements thereof without departing from the scope of the invention as set forth in the claims below. Accordingly, the specification and figures are to be regarded in an illustrative rather then a restrictive sense, and all such changes and substitutions are intended to be included within the scope of the present invention.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as a critical, required, or essential feature or element of any or all the claims. As used herein, the terms "comprises," "comprising," or any variation thereof, are intended to cover a non-exclusive inclusion, such that a process, method, article, or apparatus that comprises a list of elements does not include only those elements but may include other elements not expressly listed or inherent to such process, method, article, or apparatus. It is further understood that the use of relational terms, if any, such as first and second, top and bottom, and the like are used solely to distinguish one entity or action from another entity or action without necessarily requiring or implying any actual such relationship or order between such entities or actions.

What is claimed is:

1. A method for transferring deferrable data in a wireless communication system, the method comprising:
   receiving an instruction to transfer deferrable data, wherein the deferrable data is data of a first priority;
   determining that an air interface is congested; and
   in response to determining that the air interface is congested, transferring the deferrable data as data of a second priority, wherein the second priority is a higher priority than the first priority, wherein the deferrable data is associated with a first Service Option value, and wherein transferring comprises setting up a call for a transfer of the deferrable data based on a second Service Option value that is associated with data of the second priority.

2. The method of claim 1, wherein data of the first priority is associated with a first at least one Quality of Service (QoS) parameter, wherein data of the second priority is associated with a second at least one QoS parameter, and wherein transferring the deferrable data comprises transferring the deferrable data in association with the second at least one QoS parameter.

3. The method of claim 2, wherein the first at least one QoS parameter is associated with a first billing rate and the second at least one QoS parameter is associated with a second billing rate, wherein the second billing rate is higher than the first billing rate, and wherein the method further comprises, when the deferrable data is transferred in association with the second at least one QoS parameter, charging a customer associated with the deferrable data based on the second billing rate.

4. A method for transferring deferrable data in a wireless communication system, the method comprising:
   receiving an instruction to transfer deferrable data, wherein the deferrable data is data of a first priority;
   determining that an air interface is congested;
   in response to determining that the air interface is congested, transferring the deferrable data as data of a second priority, wherein the second priority is a higher priority than the first priority; and
   charging a customer associated with the deferrable data at a billing rate associated with data of the second priority, wherein the billing rate associated with data of the second priority is higher than the billing rate associated with data of the first priority.

5. A method for transferring deferrable data in a wireless communication system, the method comprising:
   receiving an instruction to transfer deferrable data, wherein the deferrable data is data of a first priority;
   determining that an air interface is congested;
   setting up a call for a transfer of the deferrable data, wherein the call is associated with data of the second priority, wherein the second priority is a higher priority than the first priority, and wherein setting up a call comprises establishing a data connection;
   upon completion of the transfer of the deferrable data, starting an inactivity timer; and
   upon expiration of an inactivity time period, terminating the data connection.

6. A mobile station capable of transferring deferrable data in a wireless communication system comprising:
   at least one memory device that stores deferrable data;
   a processor associated with the at least one memory device that receives an instruction to transfer deferrable data, wherein the deferrable data is data of a first priority, determines that an air interface is congested, and, in response to determining that the air interface is congested, transfers the deferrable data as data of a second priority, wherein the second priority is a higher priority than the first priority, wherein the deferrable data is associated with a first Service Option value, and wherein the processor transfers the deferrable data by setting up a call for a transfer of the deferrable data based on a second Service Option value that is associated with data of the second priority.

7. The mobile station of claim 6, wherein the processor further establishes a data connection associated with data of the second priority, transfers the deferrable data over the data connection, upon completion of the transfer of the deferrable data, starts an inactivity timer, and, upon expiration of an inactivity time period, terminates the data connection.

8. The mobile station of claim 6, wherein the at least one memory device stores a plurality of Quality of Service (QoS) parameters, wherein data of the first priority is associated with a first of at least one QoS parameter of the plurality of QoS parameters, wherein data of the second priority is associated with a second of at least one QoS parameter of the plurality of QoS parameters, and wherein the processor transfers the deferrable data in association with the second at least one QoS parameter.

9. The mobile station of claim 8, wherein the first at least one QoS parameter is associated with a first billing rate and the second at least one QoS parameter is associated with a second billing rate, wherein the second billing rate is higher than the first billing rate, and wherein the processor, when the deferrable data is transferred in association with the second at least one QoS parameter, sets up a call for a transfer of the deferrable data based on the second billing rate.

\* \* \* \* \*